Dec. 7, 1965 H. J. PARSONS ET AL 3,221,578
AUTOMATIC TWO-SLIDE MECHANISM
Filed June 13, 1962 10 Sheets-Sheet 6

United States Patent Office 3,221,578
Patented Dec. 7, 1965

3,221,578
AUTOMATIC TWO-SLIDE MECHANISM
Hubert J. Parsons, Horseheads, and Anders A. Peterson, Elmira, N.Y., assignors to Hardinge Brothers, Inc., Elmira, N.Y.
Filed June 13, 1962, Ser. No. 202,152
9 Claims. (Cl. 82—21)

This invention relates to mechanisms for use in turning, facing and boring workpieces of different shapes and sizes.

Heretofore machines have been available having two tool-holding slides movable at right angles to each other and in which the slides are moved by cams and which consequently required different cams for different workpieces.

It is one of the objects of this invention to provide a machine of this type in which the slides may be moved in different patterns and cycles without the use of cams.

Another object is to provide slides and also actuating means for the slides of new and improved construction.

A further object is to provide a machine of this type with a programmer which may be set to control automatically the successive movements of the slides to produce the desired cuts on the workpieces.

A further object is to provide mechanism of this type in which the movements of the slides are effected by electric motors each having a drive connection with a slide.

Another object is to provide drive connections between the motors and the slides including friction clutches to permit the slide to be moved against stops without stopping the rotation of the motors.

It is also an object to provide a programmer which can be manually adjusted for controlling the supply of current to the motors to control the movement of the slides.

I have illustrated my improved two-slide mechanism as applied to a lathe, but it will be understood that it is not intended to limit my invention for use with lathes of the type herein shown.

Figure 1:
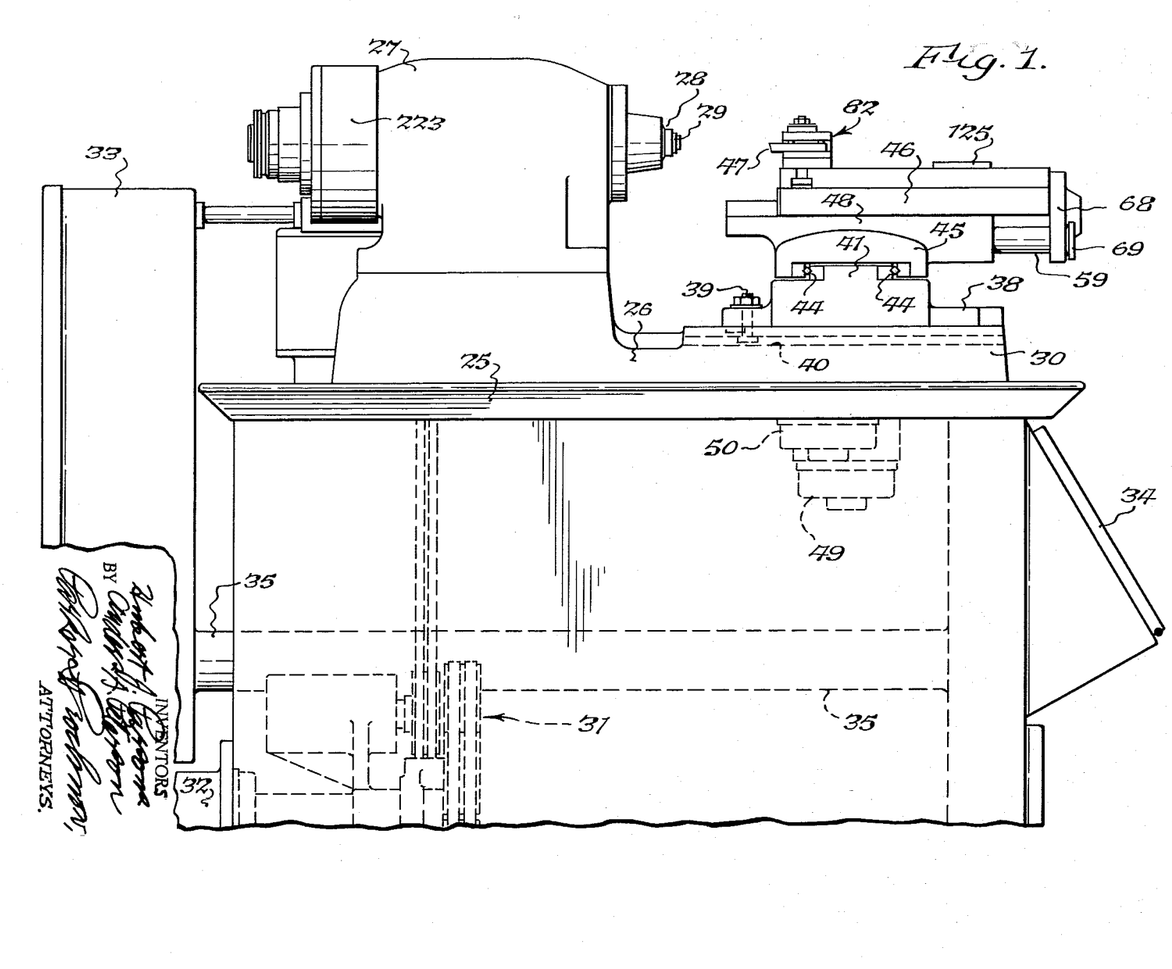
FIG. 1 is a fragmentary front elevation of a two-slide mechanism embodying this invention applied to a lathe type machine.

In FIG. 1 I have illustrated my invention as applied to a lathe type of two-slide machine having a cabinet or stand including a top or coolant and chip pan 25 mounted on legs enclosed by the usual panels. The lathe itself includes a base 26 and a headstock 27 including a spindle provided at its outer end with a chuck or collect 28. 29 represents by way of example, a workpiece held on the spindle by means of the collet. The lathe shown also has a bed 30 on which my improved two-slide mechanism is mounted. The lathe also includes a suitable speed change mechanism 31 which is contained in the cabinet. This cabinet also supports a motor 32 which rotates the spindle through the speed change mechanism and suitable drive belts. 33 represents a control box containing some of the electrical parts which operate the two-slide mechanism, and 34 represents a cover for the programmer which is hinged on the cabinet to swing into the same and which swings outwardly to facilitate setting the programmer. 35 represents a channel or conduit extending lengthwise of the cabinet in which conductors leading from the programmer extend to the control box 33.

The two-slide mechanism has a base 38 suitably secured to the bed of the lathe, for example, by means of bolts 39 having heads arranged in T-slots 40 which extend lengthwise of the bed 30. This construction enables the two-slide mechanism to be adjusted at different distances from the spindle to operate on workpieces of various lengths, and to remove the mechanism from the lathe for maintenance. This base 38 has an upwardly extending saddle or seat 41 on which parts of my improved two-slide mechanism are mounted. This mechanism may have a frame which is suitably secured to the saddle 41 in such a manner as to be accurately positioned with relation to the lathe spindle. Also it is desired to operate the slides with the minimum friction and consequently anti-friction bearings 44 are preferably provided on which the slides reciprocate.

Figures 3, 4:
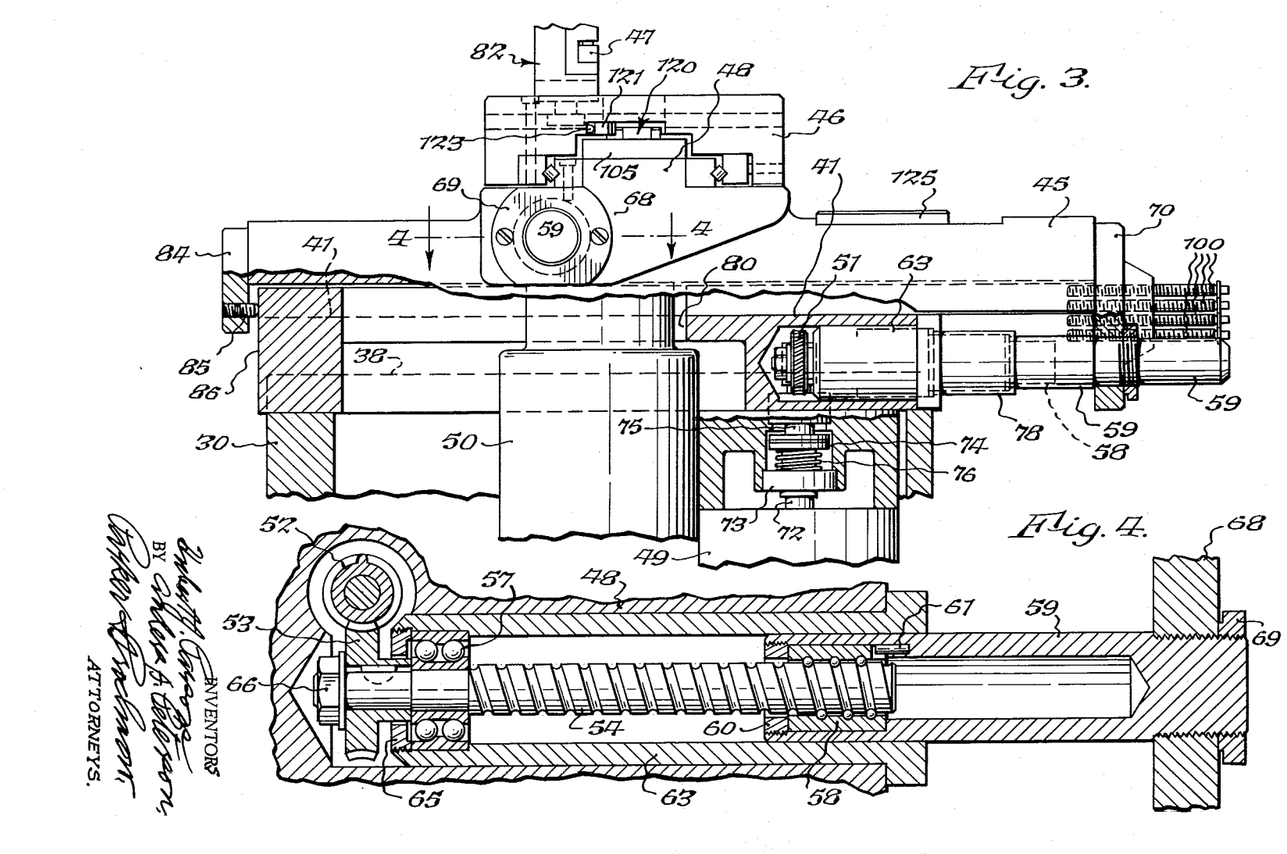
FIG. 3 is a fragmentary, sectional elevation thereof on lines 3—3, FIG. 2.
FIG. 4 is a section thereof on an enlarged scale on line 4—4, FIG. 3.

The slide mechanism includes the lower slide 45 or bed mounted to move in a direction crosswise of the spindle 28 and an upper slide 46 movable crosswise of the lower slide and in the direction of the length of the spindle. The cutting tool 47 or groups of tools are suitably mounted on the upper slide. The lower slide has a raised part or saddle 48 on which the upper slide is mounted, for example, in the same manner in which the lower slide is mounted on the saddle 41 of the bed 42. The lower slide is actuated by a motor 49 mounted on the base 38 of the mechanism and the upper slide is actuated by a motor 50 mounted on the lower slide, both motors being mounted through their end caps. The lower motor 49 drives a worm which meshes with a worm gear 51. Similarly, the motor 50 operates a worm 52, FIG. 4, which turns a worm gear 53 keyed to a ball bearing screw 54. Most of the parts which operate the top slide 46 are identical with those which operate the lower slide 45 and consequently only the mechanism shown in FIG. 4, which actuates the upper slide will be described. In both of these constructions the screw 54 is mounted at one end in a bearing 57 and cooperates with a ball bearing nut 58. Since ball bearing screws and nuts are well known, further explanation of the same is not deemed necessary. The ball bearing nut is mounted on a cylindrical bushing 59 by means of a lock nut 60, and a pin 61 prevents rotation of the ball bearing nut relatively to the bushing 59. It will be obvious from an inspection of FIG. 4 that the screw 54 moves the bushing 59 into and out of another cylinder 63 which is suitably secured in this illustration to the saddle part 48 of the lower slide mechanism. A nut 65 has a threaded engagement with one end of the cylinder 63 and holds the bearing 57 in place thereon. A nut 66 on the screw 54 secures the screw to the worm wheel 53.

The outer end of the bushing 59 is rigidly secured to an end cap 68 of the upper slide 46. This end cap has a threaded aperture into which the bushing 59 extends and a lock nut 69 secures the bushing in correct relation to the upper slide. From this description it will be obvious that when the screw 54 is turned, the upper slide 46 is moved in a direction lengthwise of the axis of the spindle. Similarly the motor 49 rotates the worm gear 51, FIG. 3 to turn another screw identical with the screw 54 arranged in a bushing which is connected at its outer end with an end cap 70 rigidly secured to the lower slide 45 in such a manner that the lower slide is moved crosswise of the axis of the spindle.

The connection between the motors 49 and 50 with their worm is identical and consequently only the connection of the motor 49 with the lower slide will now be described.

The motor shaft 72 cooperates with a bearing 73, FIG. 3, secured on the bed, and is provided at its upper end with a slip clutch 74 which connects the motor shaft with shaft 75 on which the worm is mounted. The lower plate of the slip clutch is urged by means of a spring 76 into frictional contact with the upper clutch plate and the spring and clutch plates are so related to each other that if the slide connected with the worm is held against movement, the motor may continue to rotate, but the slip clutch will impart no motion to the worm and its gear. The bushing 59 of the lower slide is provided with a slidable, cylindrical cover member 78, which is slidable within the cylinder 63 and attached at its outer end to the bushing 59 and prevents dust and other foreign matter from interfering with the operation of the mechanism of the lower slide. This type of dust cover is not needed on the upper slide about the bushing since the movement of the same is not as long as that of the lower slide.

Since the movement of the upper slide is in a direction transverse of the movement of the lower slide, the base 38 is provided with an elongated opening 80 through which the motor 50 for the upper slide extends and in which it moves lengthwise of the opening during movement of the lower slide. The cutting tool 47 may be securely mounted on the upper slide in any suitable or desired manner, and if desired, a plurality of these cutting tools may be mounted at the same time in a tool holder 82.

Figure 2:
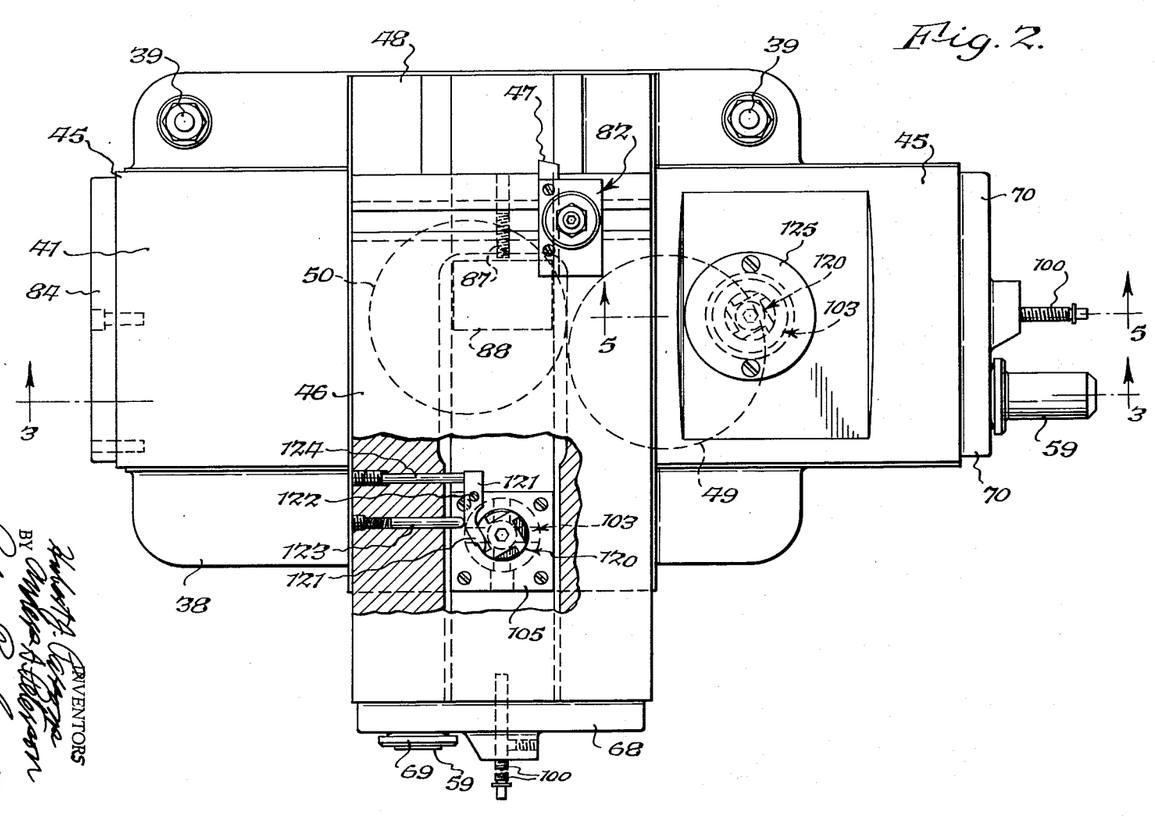
FIG. 2 is a top plan view, partly in section, and on an enlarged scale, of my improved two-slide mechanism.

The lower slide has an end cap 84 mounted thereon and which carries a stop screw 85 positioned to engage an end part 86 of the bed of the mechanism. This screw is adjusted to stop movement of the bottom slide. A similar stop screw 87, FIG. 2 is employed in connection with the upper slide and abuts against a block 88 secured on the lower slide.

Figure 13:
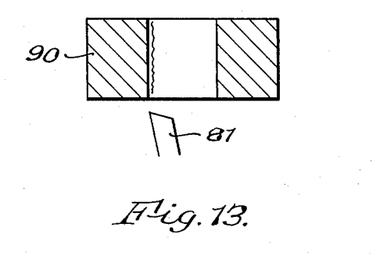
FIGS. 13–19 are central, sectional views of various workpieces showing some of the machining operations which can be done by my improved two-slide mechanism.

Each of the two slides is provided with means for controlling the movement of the same relatively to the workpiece a number of times, depending upon how many different cuts are to be made in the workpiece. For example, in a single workpiece as shown in FIG. 13, the cutting tool 81 may be set to make a single cut for forming the bore of a workpiece 90. In connection with making this cut, the tool 81 is first moved to the left from a starting position against a stop into alinement with the edge of the bore of the workpiece to be cut. The tool is then fed into the interior of the workpiece to make a cut, and then to the right to move away from the cutting surface, and then back out of the workpiece and again to the right to the starting position.

Figure 14:
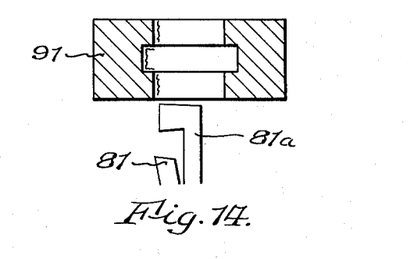

In FIG. 14 a different workpiece is shown in which the cutting tool 81 first performs the operations described in connection with FIG. 13, after which the tools are returned to the starting position and then moved back to effect the cutting of the internal groove by the second cutting tool 81a. This tool is moved into the bore of the workpiece rapidly while feeding to the left slowly. When the infeed stops the left feed continues, cutting the groove until it stops, after which tool is fed to the right and withdrawn rapidly while stillfeeding and then moved rapidly to its starting position. During the various cutting operations the tool is moved slowly in accordance with the time required to make the cut, but in movements of the tool to and away from its cutting positions, these movements when the tool is out of contact with the work, may be made much faster.

Figure 15:
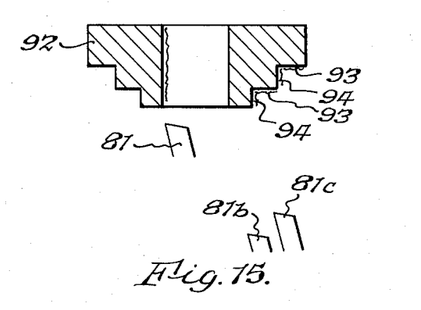

In FIG. 15 is shown a workpiece 92 which requires the finishing of the bore in the workpiece which may be done as described in connection with FIGS. 13 and 14, by means of the tool 81. Two other tools 81b and 81c are mounted in such relation to each other so that while the tool 81 is moving to make the cut in the bore in the workpiece, the tools 81b and 81c are advanced to cut the axial faces 94 on the workpiece, whereupon the tool holder is moved to the right to cause the tools 81b and 81c to cut the radial faces 93.

Figure 16:
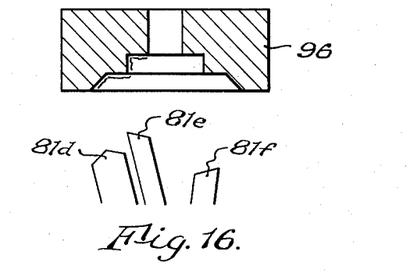

In FIG. 16 is illustrated a workpiece 96 having a contour which requires three cutting tools 81d, 81e and 81f, the tool 81f finishing the face of the workpiece.

Figure 17:
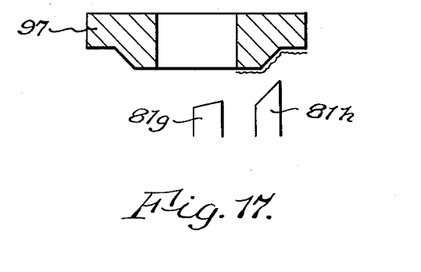
Figure 18:
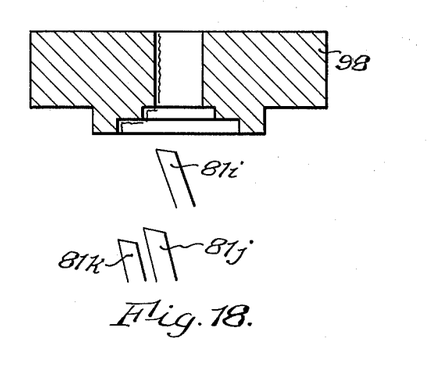

From the foregoing description it will be obvious that the surfaces indicated by wavy light lines in FIGS. 17 and 18 can be trimmed by means of a single operation of the cutting tools to the workpiece. Similarly it will be readily understood how the cutting tools 81g and 81h form the cuts indicated in the workpiece 97 and how the cutting tools 81i, 81j and 81k can similarly produce the cuts required on the workpiece 98.

Figure 19:
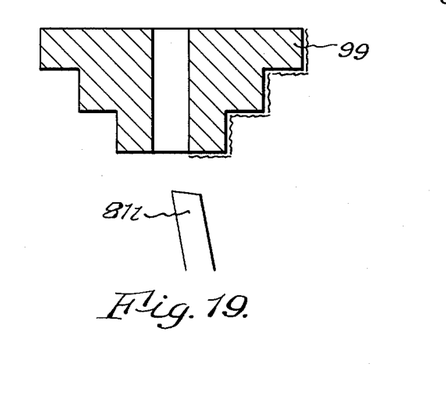

In connection with the workpiece 99 shown in FIG. 19, the various surfaces can be cut by means of a single cutting tool. In this case the cutting tool 81l, after cutting the adjacent radial and axially extending surfaces in one step, is returned to starting position and moved back to effect the cuts on the next radial and axial faces in the second step and then back again to starting position and to the workpiece to effect the cuts on the third step.

It will be obvious from the foregoing description of some of the types of workpieces that can be cut by means of my improved two-slide mechanism, that a considerable number of stops are required for each of the slides as well as electrical connections for actuating the motors to move the cutting tool to and from the workpiece and through the cutting operation.

Figure 5:
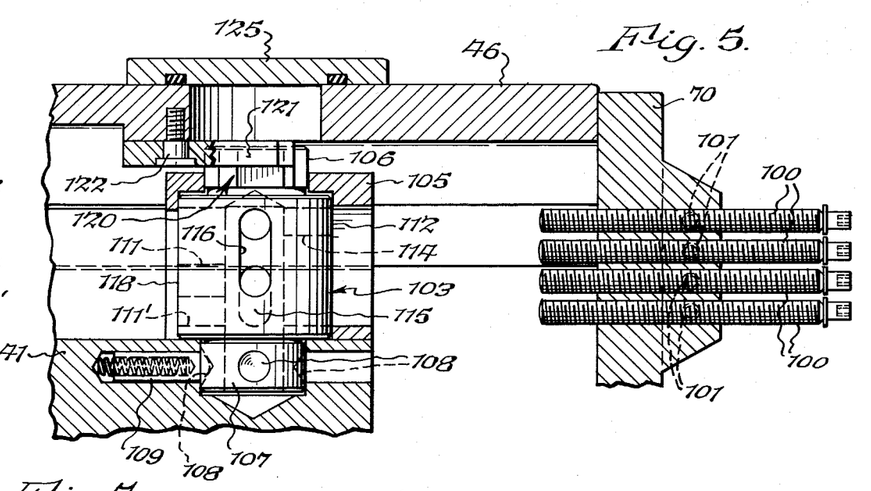
FIG. 5 is a sectional elevation thereof on line 5—5, FIG. 2.

Some of the stops for controlling the operation of my improved two-slide mechanism are illustrated by way of example in FIGS. 3 and 5 for use in connection with the lower slide, but it is pointed out that the stops for use with the upper slide are identical with those shown in FIGS. 3 and 5. The lower slide is provided in the end cap 70 with stop screws or projections adjustably mounted thereon, four such screws 100 being shown in the construction illustrated. These screws or projections are adjustable relatively to their slide, for example, the screws may have a threaded engagement with the end cap 70, and locking screws 101 are provided which extend radially of the stop screws 100 through a boss on the end cap for holding the stop screws in adjusted positions. These stop screws cooperate with a stop member or abutment which, in the construction illustrated, is in the form of a drum 103 having four faces for cooperation with these four stop screws. The stop drum 103 is rotatable to successively present these four stop faces to the stop screws 100.

The stop screw 85 is adjusted to stop movement of the lower slide at the exact time that the stop drum is indexed to its working position, and acts as a home position for the slide. A similar action results when the stop screw 87 of the upper slide abuts against the block 88.

The stop drum 103 shown in FIGS. 5-8 is rotatably mounted in a cage 105 secured to the stationary bed of the mechanism, or in the case of the similar drum used in connection with the upper slide, the corresponding cage is mounted on the lower slide.

The drum has upwardly and downwardly extending integral hubs 106 and 107 and the lower hub may be provided with four recesses 108 into which a spring pressed plunger 109 may enter to yieldingly hold the stop drum with any of its four faces arranged opposite its stop screw.

Figure 6:
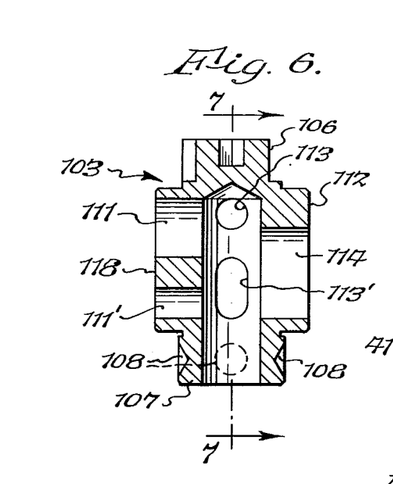
FIG. 6 is a sectional view of a stop member for limiting the movement of one of the slides of my mechanism.
Figure 7:
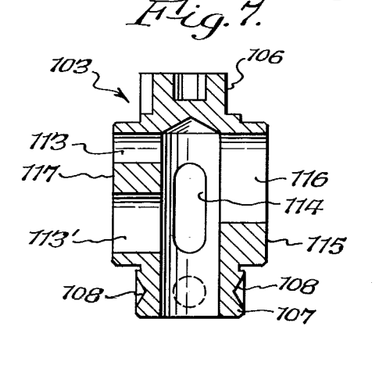
FIG. 7 is a section thereof on line 7—7, FIG. 6.
Figure 8:
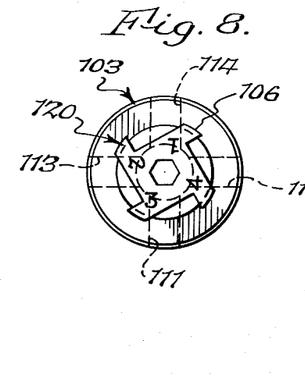
FIG. 8 is a top plan view of a ratchet for rotating the stop member.

The stop drum is provided on each of its stop faces with parts adapted to be engaged by one only of the screws 100. For example, the upper screw 100 may engage with a part 112 of one of the faces of the stop drum and this face is also provided with a recess or depression 114 in which the other stop screws 100 may enter without contacting any part of the stop drum. Similar contacting parts of the other faces of the stop drum may be provided. For example, in FIG. 7, the part 115 is provided for contact with the lower of the four screws 100, this face of the drum having a bored out part 116 into which the upper three screws 100 enter so that only the lower screw will come into engagement with the stop drum. Similarly FIG. 7 shows a part 117 with which the second screw 100 may engage when the stop drum is in the second position, and 118, FIG. 6 shows the part of the face with which the third screw engages to stop the movement of the lower slide, the openings 113, 113' and 111, 111' being used with the stop faces 117 and 118 respectively for other stop screws to enter.

Means are provided for rotating the stop drum through a quarter turn during each return movement of the slide. For this purpose there is provided on the upper end of the stop drum a four toothed ratchet 120 made integral with the stop drum and the slide has a pawl 121 pivoted thereon in position for its free end to engage one of the outwardly extending teeth of the ratchet 120 during each successive return movement of the slide. This pawl is pivoted by means of a screw 122 to the slide 46. Consequently, during the return movement of the slide, the pawl 121 will engage with one of the teeth of the ratchet and turn the stop drum to the next operative position. A spring actuated plunger 123, FIG. 2, urges the latch toward the ratchet and a stop plunger 124 limits the extent to which the latch can swing toward the ratchet.

For convenience in enabling an operator to adjust the stop screws 100 in desired relation to the stop drum, the ratchet is preferably provided on its upper face with numerals corresponding to the number of faces on the drum, the numerals 1, 2, 3, and 4 being shown on the drawings. The slide 46 is provided above the stop drum with an opening closed by a liquid-tight, transparent plastic cover 125 which enables the operator to see the numerals on the ratchet and thus determine the position which the stop drum occupies while he adjusts the stop screws 100. The cover can be swung open quickly to enable turning the stop drum manually when setting up.

It will thus be obvious that when machining the workpiece shown in FIG. 14, the apparatus is set so that the tool 81 is moved by the lower slide transversely of the axis of the spindle until the tool is in the position shown in FIG. 14 with one of the screws 100 against the face of the stop drum. The upper slide then moves the tool toward the work to make the cut in its bore, whereupon the lower slide will cause the tool to move radially toward the axis of the spindle out of contact with the work. The tool is then returned to a position clear of the workpiece by the upper slide and then moved to the right to its starting position where it is stopped by engagement of the screw 85 with the end part 86. It will be noted that the screw 100 which causes the tool 81 to move initially into the position shown in FIG. 14 must be very accurately set so that the bore in the workpiece will be of correct diameter.

The movement of the slides to bring the tool 81a into position for cutting the groove within the workpiece 91 will be effected in a similar manner by controlling the movement of the two slides, in which case the screws 100 for controlling the inward movement of the tool 81a into the workpiece and the screw which stops the cutting movement of the tool 81a after the groove has been cut to the desired depth must be accurately controlled.

In the mechanism thus far described, including the pair of slides mounted one on top of the other, which are independently movable forwardly or backwardly and which can dwell against stops with a constant pressure by the slipping of the clutches with the motors running. Fast traverse of the tool into and out of the cutting movements of the tool can be obtained by running the driving motors 49 and 50 at high speeds, and the motors can be slowed down with dynamic braking to make the slow down from the traverse motion to the cutting motion fast. Facing of a workpiece can be done by moving the top slide inwardly against a stop and keeping its motor running to hold it against the stop while traversing the lower slide rapidly into work position, and then slowing to a feed rate while making a cut. After the cut has been completed, both motors are reversed at the traverse rate of speed and the slides returned. Boring or turning is done by the reverse action of moving the bottom slide against a stop which determines the size of a bore or external diameter to be turned, and then holding the bottom slide while the top slide feeds the tool to the workpiece. As many as four different diameters or faces can be produced on a workpiece in one setting, three being shown in FIG. 9, by returning the slides to go into stops for the subsequent operation. If only one set of stops is required, all four stops on each slide can be set the same, or only one stop can be set and the slide not travelled back to the indexing point, or screw 124 can be screwed in farther which will hold the pawl 121 out so it cannot engage the ratchet when the slide moves back. The various movements above referred to can be obtained by cooperation of the programming mechanism and electrical connections which will now be described.

The programmer, FIGS. 9-12 includes a number of cams which are rotated to actuate limit switches which through electrical connections control the movements of the two slides.

Figures 11, 12:
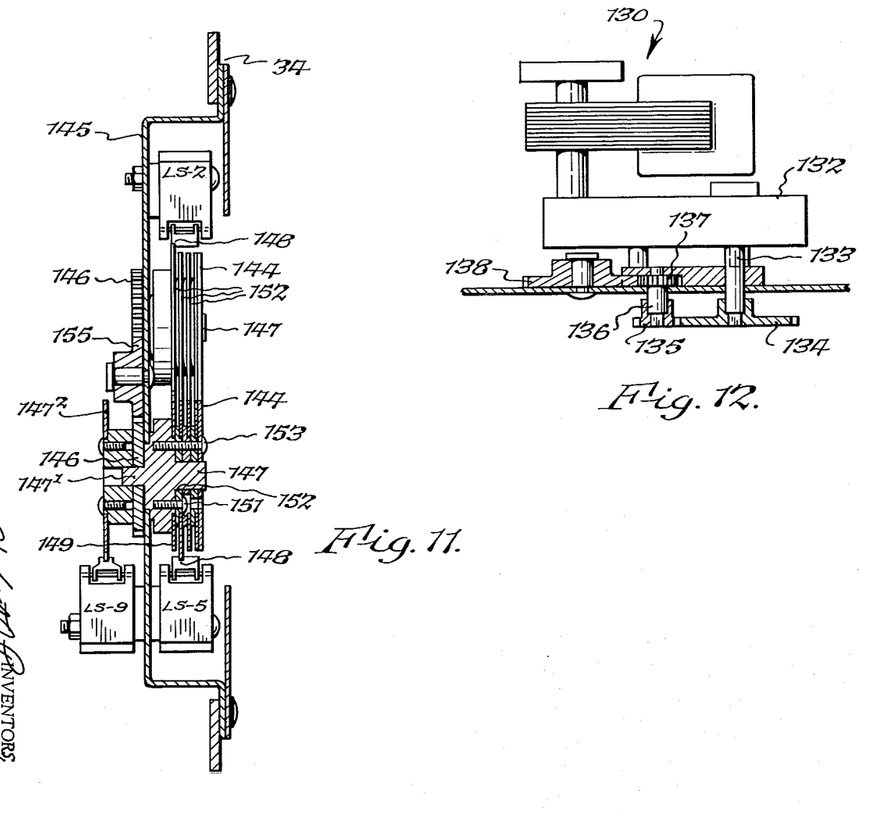
FIG. 11 is a sectional view thereof on line 11—11, FIG. 9.
FIG. 12 is a sectional view thereof on line 12—12, FIG. 9.

Movement may be imparted to the cams of the programmer in any suitable manner, for example, by means of a synchronous motor 130, FIG. 12, the armature of which is connected to a shaft which rotates a drive shaft 133 through suitable gearing in a gear box 132. This drive shaft is releasably connected to a suitable gear 134 meshing with a pinion 135 mounted on a shaft 136. The end of the shafts 133 and 136 may, for example, be square to cooperate with square bores in the gears 134 and 135 so that these gears can be readily removed from the shafts and replaced by other gears for operating the programmer at different rates of speed. The shaft 136 has a gear 137 mounted thereon which meshes with a gear 138. The programmer motor 130 has a brake mounted on it which eliminates any coasting when the motor is shut off.

Figures 9, 10:
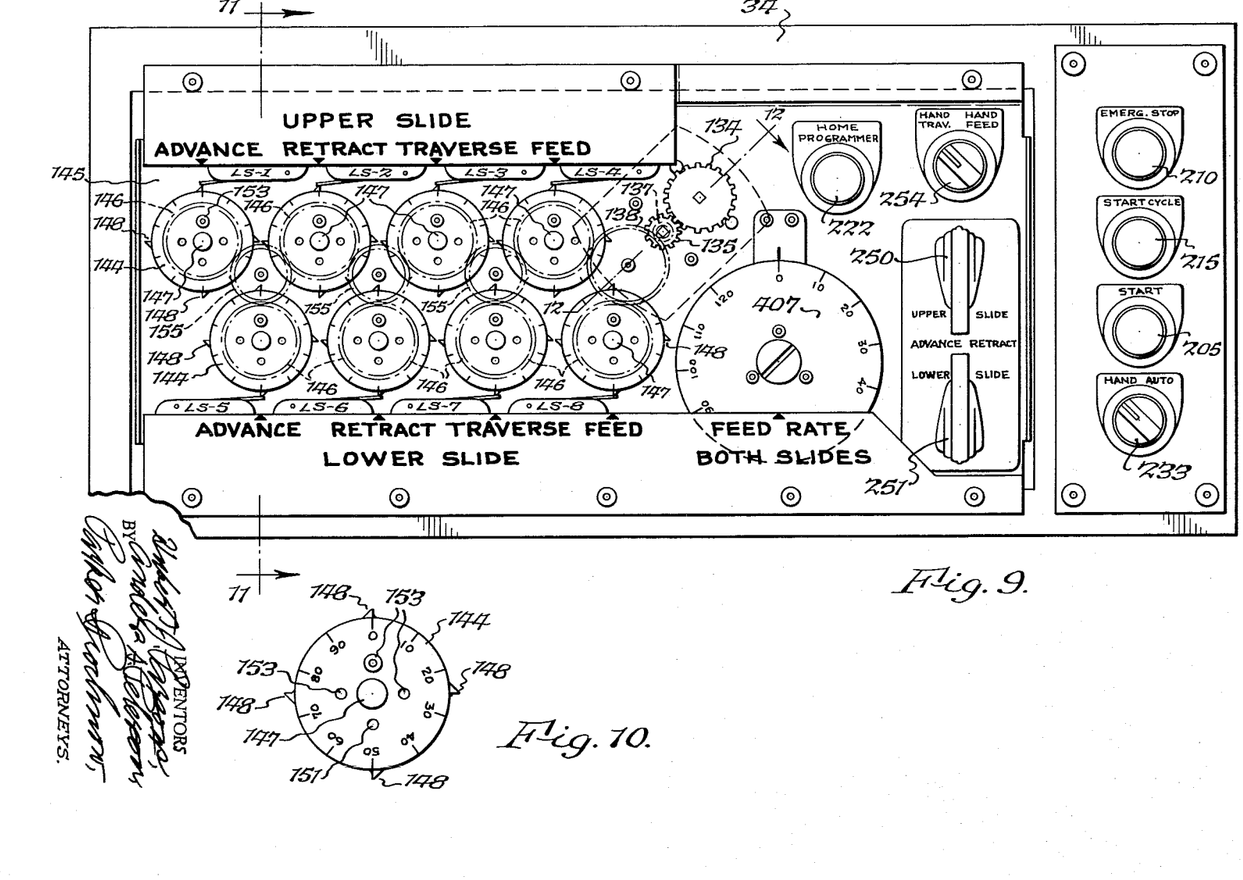
FIG. 9 is a face view of a programmer panel for controlling various operations of the two-slide machine embodying this invention.
FIG. 10 is a face view of one of the control disks of the programmer removed therefrom.

The programmer in the particular construction illustrated by way of example includes eight program dials 144 shown in FIG. 9, the upper four being connected electrically through cam switches with the upper slide and the lower four with the lower slide. Each program dial is provided with cams which operate a limit switch wired to a function controlling relay.

The program dials and their cams are rotatably mounted on a frame or support 145. Each program dial is mounted on a gear 146 provided with an outwardly extending hub 147. Four cams are mounted on each hub, these cams each having a projection 148 for actuating a microswitch when the projection of a cam moves into engagement with its switch. These switches are designated LS–1, LS–2, LS–3, LS–4, LS–5, LS–6, LS–7 and LS–8. The cams are individually adjustable about the gear 146 in any suitable manner. For example, as shown in FIG. 11, the cam 48 is arranged adjacent to a radial face of the gear and may be clamped in any desired position relative to the gear by means of the head of screw 151 bearing against the cam. Stepped disks 152 are provided between the cams to space them apart properly and to act as pivots about which they are adjustably rotated. The screw 151 is accessible through openings in the disks and in the program dial and may be released to permit its cam to be turned into the desired position, whereupon this screw is tightened against the cam 148 and presses it against the flat face of the disk. In a similar manner the other two cams may be adjusted by screws 153, each longer or shorter which clamp their cams into fixed relation to the gear, for example, by pressing them against the preceding disks after they have been adjusted. The last of the cams is then clamped into position by means of a screw 153. Each of the eight program dials is similarly constructed and all of them are driven at the same rate of speed. As clearly shown in FIG. 9, the gear 138 meshes with two of the gears of adjacent program dials and idler gears 155 provide rotation of the other program dials and their cams.

From the foregoing description it will be noted that any one of all of the projections of the four cams may actuate the limit switches at the desired time depending upon their setting.

Any suitable electrical connections and devices may be employed to effect the automatic operation of the two-slide mechanism herein described. Before the automatic mechanism is placed into operation it is very essential that a fan motor, a coolant motor and the lathe spindle motor, not shown in the drawings, be in operation, and for this purpose we provide overload relays connected with each of these motors and in series with each other and with the main source of current leading to the mechanism. These overload switches may be of any usual or suitable type and are indicated in multiple as 199, in circuit diagram FIG. 20, but it will be understood that by connecting them in series, then if any one of these motors becomes overloaded, the supply of current to the entire automatic mechanism will be interrupted. These overload switches may be arranged in series between the two terminals 200 and 201 arranged in the secondary circuit of a transformer 202, one terminal of which is connected with the line 203, as shown at the right hand side of FIGS. 20–22. These three figures taken together constitute a single diagram of connections such as may be used in connection with the operation of our two-slide mechanism.

Figure 20:
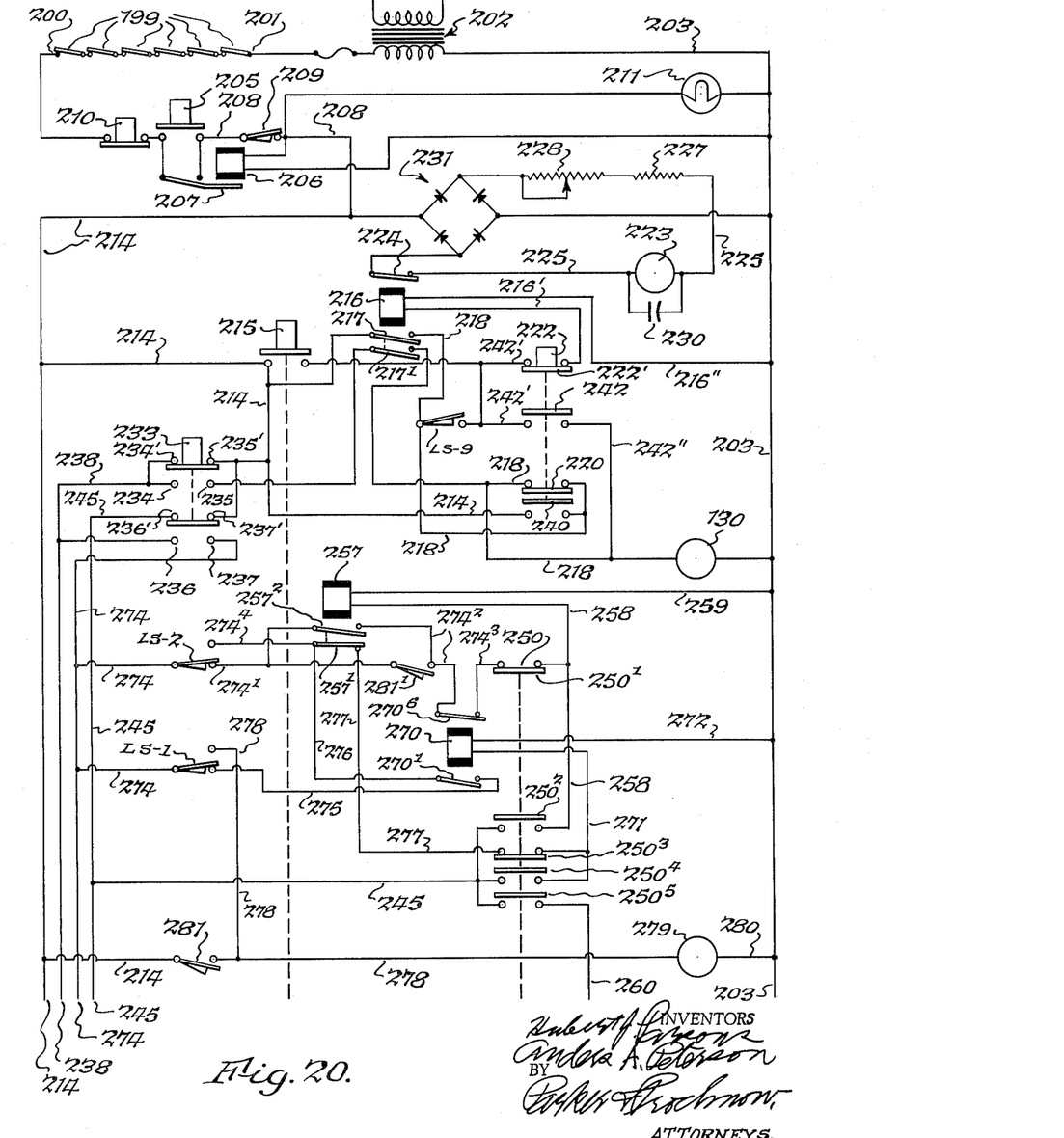
FIGS. 20–22 show diagrammatically the electrical connections between the electrical components of the mechanism and its programmer.

When a Start button 205 of the programmer shown in FIG. 20 is depressed, a solenoid 206 is energized which causes a holding contact member 207 to close a circuit to the line 208, which also preferably includes a switch 209 connected with a spindle lock pin, not shown, which when in open circuit position means that the lock pin holds the spindle of the lathe against rotation. 210 represents an emergency stop switch which may be depressed at any time to break the circuit to the line 203. This spindle lock pin switch, if in open circuit position will prevent the solenoid 206 from being energized so that the switch 209 will have to be in closed circuit position for its lock pin to release the spindle before the system can be started. This spindle lock prevents turning of the spindle while a different collet is being placed in the spindle, when setting up a new job and the operator sometimes forgets to disengage it before starting the machine. The solenoid 206 also functions to release the circuit closer 207 if the voltage is too low to operate the system or fails entirely, and this solenoid will not actuate the circuit closer 207 until the button 205 is then pushed in, thus eliminating an unexpected start of the system after a voltage loss. A signal light 211 may be included in the circuit to indicate when the system is in operation. The closing of the circuit by means of the starting button 205 and holding contact 207 supplies power to the line 214 at the left of the diagram.

When the solenoid 206 is energized and in circuit closing position, a start cycle button 215, FIGS. 9 and 20, is pressed to close a circuit from the line 214 through a solenoid 216 closing a switch 217 connected with a conductor 218 leading to the limit switch LS9. This switch is open when the start cycle button 215 is pushed into circuit closing position since the programmer is at its home position, but as soon as the start cycle button 215 is pushed, the programmer motor 130 starts through closed contact 220 of home programmer button 222 and the contact closer 217 actuated by the solenoid 216 and limit switch LS9 will be closed. Upon releasing start cycle button 215 current flows from the line 214, contactor 217, line 218, contactor 220, line 218, programmer motor 130 to the other side of the line 203 keeping motor 130 energized. When the limit switch LS9 closes it holds the solenoid 216 energized which keeps the programmer motor 130 running until the cam controlling the limit switch LS9 has made one revolution, which opens this limit switch, deenergizing the solenoid 216 and stopping the programmer motor. When the solenoid 216 is energized, three contacts (not shown) in the main power circuit also close, thus starting the coolant motor and spindle motor and releasing the electric spindle brake 223 by the opening of switch 224, which deenergized the brake. This procedure reverses whein the solenoid 216 becomes deenergized after the cycle has been completed by shutting off the power to the coolant motor and applying direct current to the spindle brake, thus rapidly stopping the spindle. The line 225 to the brake includes fixed and variable resistances 227 and 228 for adjusting the stopping time of the brake. 230 represents a capacitance across the brake coil to protect the contact points and the rectifiers 231 from the surges of current when the brake is shut off.

A hand automatic switch 233, which is indicated on the diagram as a push button for simplification, but actually is a two-position selector switch which when in auto position connects the two sets of terminals 234, 235 and 236 and 237. When in Hand position, as shown in full lines in FIG. 20, this switch connects the line 214 with a conductor 238 through the upper contacts 234' and 235', while the upper contacts 236' and 237' connect the line 214 to a line 245.

The home programmer button 222 may be pushed in at any time, but usually during the setting up of the programmer or after an emergency stop. When this button is pushed the programmer motor 130 will receive current through the contact closer 240 connected with the button 222 and through the closed limit switch LS9 and through a circuit closer 242. In this instance current flows from the line 214, contact closer 240 to line 218, limit switch LS9, line 242' contact closer 242, line 242" line 218, the programmer motor 130 to the other side of the line 203 completing the circuit. This button is held down until the motor 130 drives the programmer to Home position, at which time the limit switch LS9 opens and shuts it off in that position.

Figure 21:
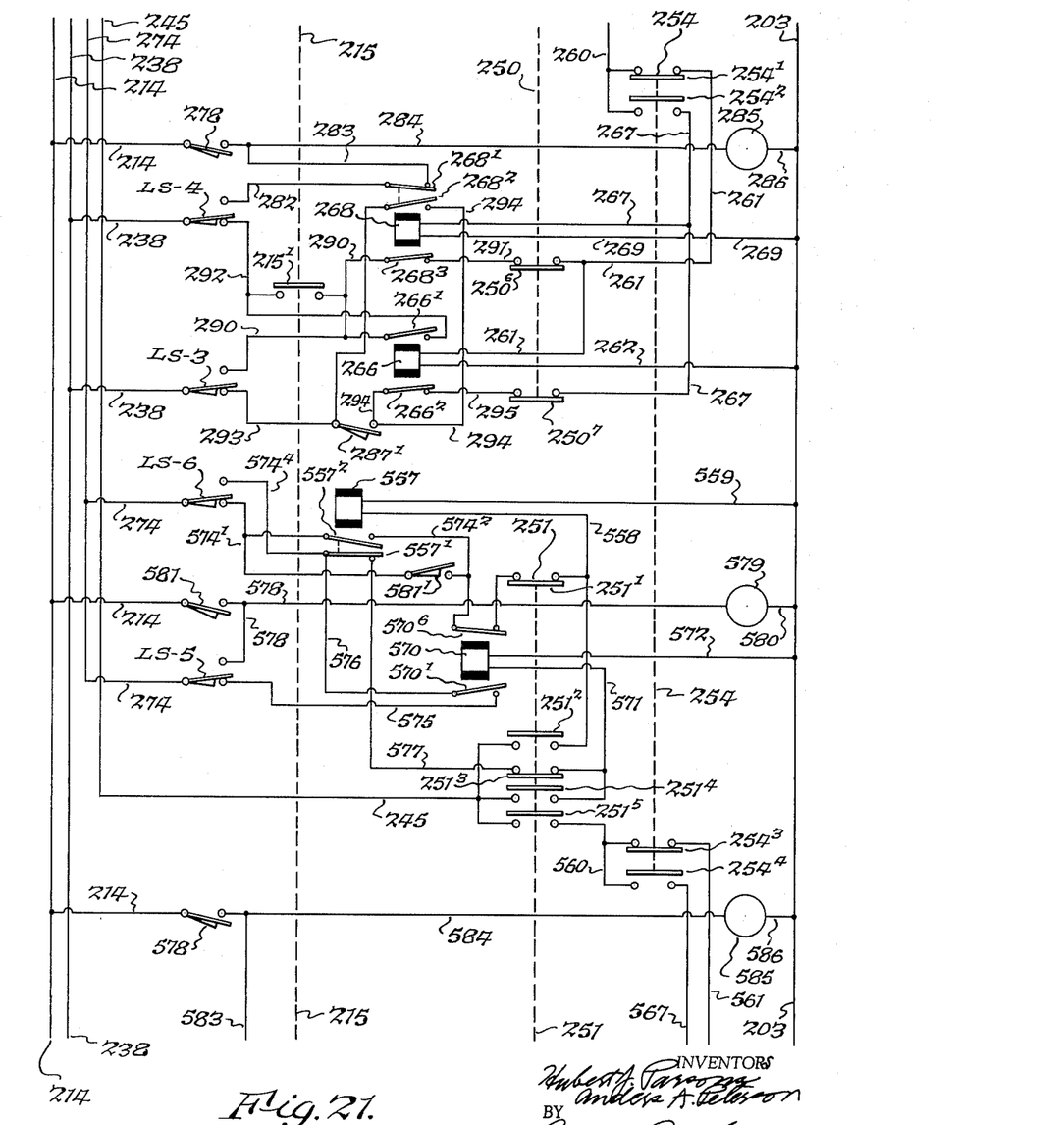
Figure 22:
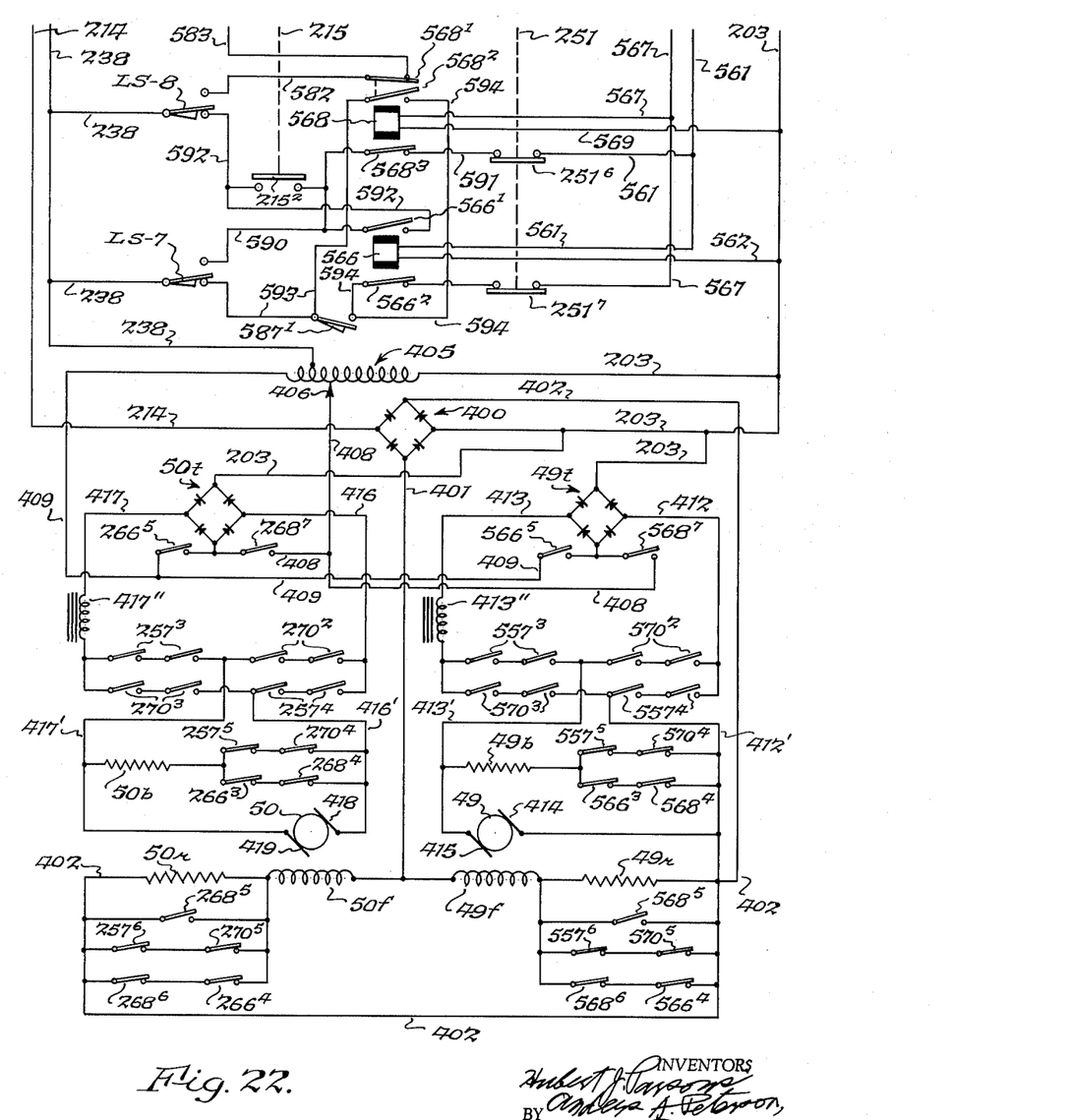

The slides of the mechanism can be advanced or retracted during set up or after an emergency stop by using the Advance-Retract switches 250 and 251, FIGS. 20–22. One of these switches is provided for each slide and to make them operable the Hand auto switch must be in Hand position.

The simplified diagrammatic representation the Advance-Retract switches for the upper slide 250 and the lower slide 251 are shown as having push pull type of contactors that make and break contacts at their extreme positions. In use they are actually rotary type switches which have a center position and a position on either side of center position. Therefore certain contacts will herein later be identified as contacts that are closed in both of the extreme positions and open in the center position of that switch. The switches 250 and 251 on the diagrams are shown in their center or normal positions. These switches are normally in center position and are returned to this position by a spring after they have been moved to either side position. The hand traverse feed switch 254 is a two position selector switch. It selects whether the advancing or retracting is done at low or feed speed or at traverse or high speed, and is shown on the diagrams in the traverse position.

As will be noted in the diagrams, the current supply lines 214 and 203 continue down from FIG. 20 to FIG. 21, and then to FIG. 22 where in the lower part of this FIG. 22 is illustrated the circuits and controls for the upper and lower slide motors 50 and 49. This will be described now to make more easily understood how the Hand control, the Automatic control, the Advance-Retract and Feed traverse switches control these slide motors when they are later described.

Current is supplied from the line 214 to one junction of a field bridge rectifier 400, the opposite junction being connected to the other side of the line 203. The other two junctions of the rectifier 400 are connected to the lines 401 and 402, the line 401 having a common connection with the field coils 50f and 49f, while the line 402 has a common connection to the field resistances 50r and 49r, connected to the field coils 50f and 49f. Across each of these resistors 50r and 49r are connected several control relay operated switches the purpose of which and the operation of which will be explained later. It will now be seen that when the start button switch 205 is closed, rectified D.C. current will be supplied to the field windings 50f and 49f of the slide motors 50 and 49.

The line 238 supplies current through the Hand auto switch 233, contacts 234, 235 from the line 214 to a variable voltage auto transformer 405 which is also connected to the other side of the line 203. A contactor 406 is operable by a dial 407 on the programmer panel, FIG. 9, may be adjusted to increase or decrease the voltage supplied by this auto transformer. The contactor 406 connects to the lines 408 which supply alternating current to two armature rectifiers 50t and 49t through switches 568⁷ and 268⁷. The opposite junction of the rectifiers 50t and 49t are connected to the other side of the line 203 to complete the circuit. When these relay operated switches 268⁷ and 568⁷ are closed the rectifiers 50t and 49t are supplied with a lower adjusted voltage from the auto transformer which gives low or feed speed to the motor armatures of the upper or lower slides. Another set of switches 266⁵ and 566⁵ have a parallel connection to the rectifiers 50t and 49t with the just mentioned switches 268⁷ and 568⁷, but these are connected to the 238 side of the line resulting in a higher than full line voltage being applied. When these switches are closed the motor armatures of the upper or lower slides operate at high or traverse speed. The output junctions of the rectifier 49t connect with the lines 412, 412', 413 and 413' to the brushes 414 and 415 of the lower slide motor armature 49 while the output junctions of the rectifier 50t connect with the line 416, 416' and 417, 417' to the brushes 418 and 419 of the upper slide motor armature 50. In series with the lines 412, 412', 413, 413', 416, 416', 417 and 417' are relay controlled reversing switches to be explained later more fully while each line 413 and 417 have inductances or chokes 413" and 417" to smooth out the ripple in the direct current from the rectifiers 50t and 49t. Thus we now have current available to both the field coils and the armatures of the upper and lower slide motors 50 and 49. The feed speed of these slide motors can be varied through adjustment of the auto transformer and the slides can be retracted by reversal of the slide motors through the reversing switches.

In the following description the operation of the upper control section will be described which controls only one of the slide motors, the upper slide motor 50. It will be understood that the lower relay section which controls the lower slide motor operates in a similar manner.

With the Hand-auto switch 233 in Hand position and the Hand Traverse Feed switch 254, FIG. 21 in traverse position and the Advance-Retract switch for the upper slide in Advance position, current is supplied from the 214 side of the line through Hand Auto switch 233 and its closed contacts 237' and 236', line 245 to the now closed contactor 250², line 258, relay 257, line 259 to the other side of the line 203 completing the circuit and energizing the relay 257. At the same time current also flows through the now closed contactor 250⁵, line 260, Hand Traverse Feed contactor 254¹, FIG. 21, line 261, relay 266, line 262 to the other side of the line 203, thus energizing the relay 266 also.

Going back to the now energized relay 257 which operates the contacts 257³, 257⁴, 257⁵ and 257⁶ shown in FIG. 22 in the armature circuit lines 416, 416', 417, 417', it will be seen that current of one polarity will flow from the rectifier 50t line 417, inductance 417", now closed switches 257³, line 417' to the armature brush 419, while current of the opposite polarity will flow from the rectifier 50t through line 416 now closed switches 257⁴, line 416' to the other brush 418 of the upper slide motor 50, thus providing current for it to advance the slide. It should also be noted that the relay switches 257⁵ and 266³ connecting a braking resistor across the armature brushes 418, 419, are now open to disconnect the resistor. In the field circuit of the motor 50 the relay switch 257⁶ is now open as is the relay switch 266⁴, thus permitting the field resistor 50r to weaken the flux of the field coil 50f and let it operate at high or traverse speed.

If feed travel is desired, the Hand traverse feed switch 254, FIG. 21 is moved to the feed position and current from the line 260 will then flow through the contactor 254² to the other side of the line 203, thus energizing this relay 268. Energization of this relay 268 instead of the relay 266 causes the closing of its switch 268⁵, FIG. 22, which shorts out the field weakening resistor 50r, causing the motor 50 to run in low speed or feed speed with full voltage on its field coils 50f. The relay switch 268⁷ by its closing now provides also preselected voltage to the rectifier 50t to govern the speed of the motor armature 50 and hence the Feed rate of the upper slide.

If the Advance-Retract switch 250 is placed in Retract position, the Retract Relay 270 will be energized, as will now be explained. Current from the line 245 will be conducted across the contactor 250⁴ of the Advance-Retract switch to the line 271 the relay 270, line 272 to the other side of the line 203 completing the circuit and energizing the relay 270. Looking now at FIG. 22, we find that the other switches operated by this relay, namely switches 270² and 270³ connect the lines 417' and 416' and the armature brushes 419 and 418 with opposite polarity with the rectifier 50t thereby reversing the upper slide motor 50. Also if at the same time the Hand Traverse Feed switch 254 is in traverse position, the traverse relay 266 will be energized as previously explained and switch 266⁴ will be opened as will be the switch 270⁵ operated by the now energized relay 270 so that the field coil 50f of this upper slide motor 50 will operate at traverse speed because of the field weakening resistor 50r being in series with the field 50f, and also because relay switch 266⁵ will now be closed and the rectifier 50t will be supplied with higher than full line voltage between lines 409 and 203. Also, as previously explained, if Feed travel is desired, the Hand Traverse Feed switch 254 is moved to the feed position and current from the line 260 will flow through contactor 254², FIG. 21 to the line 267, relay 268, line 269 to the other side of the line 203, thus energizing the relay 268. This causes the switch 268⁵ to short out the resistor 50r as well as the closing of switch 268⁷ supplying the armature rectifier 50t with preselected voltage, causing the motor 50 to run in preselected Feed speed.

From the above it will now be seen that the operator can at will, by proper manipulation of the various control switches mentioned, cause the upper slide to advance or retract in either traverse or feed speeds to whatever extent he desires when setting up jobs.

The programmer as previously mentioned has eight adjustable program dials 144, each of these having four individually adjustable cam disks 149, and all of which rotate in unison at identical speeds on their gear driven hubs 147.

As will be noted by the legends on the upper slide panel, an Advance switch LS1, a Retract switch LS2, a traverse switch LS3 and a Feed switch LS4 are located and identified above each of four dials 144 for programming of the Upper slide, while on the Lower Slide panel an Advance switch LS5, Retract switch LS6, traverse switch LS7 and Feed switch LS8 are identified. It should be noted at this time that since each dial 144 and hub 147 has four adjustable disk cams 149 that, for each revolution its switch can be actuated four times in one revolution or any lesser number of times down to only one actuation in a revolution, and also that these actuations of the switch can be spread between any number of degrees of the dial.

From the above it can be seen that in any complete cycle of these dials one can program the Upper Slide and the Lower Slide movements as to speed of movement, either in advance or retract and the timing of these movements and by changing the drive change gears 134 and 135, the duration of the complete cycle may be lengthened or shortened.

Referring now to automatic programmed operation of the Upper Slide only, let us assume that the cams of the programmer are set up and the switches LS1, LS2, LS3 and LS4 will be actuated in the desired sequence to form or machine the work-piece desired. We will assume that the Hand Automatic switch 233 is in automatic position and the Start Cycle switch 215 has been pushed in. Current from the one side of the line 214 flows through the Start Cycle button to the line 242' through the upper contactor 222' of the Home Programmer switch 222, line 216', relay 216 and line 216'' completing the circuit to the other side of the line 203. Since relay 216 is now energized its contactors 217 and 217' are closed and its contactor 224 is now open. The opening of 224 breaks the circuit to the spindle brake 223, thus releasing the spindle of the machine to rotate the piece to be machined. Current flowing from line 214 through now closed contactor 217 to line 218 through the closed contactor 220, line 218 to the programmer motor 130 and then to the other side of the line 203 sets the programmer into operation. Since the slides are always back in their starting positions when the cycle is finished, it is always desirable to start forward at the traverse rate to get the tools to the work quickly. Two contactors 215¹ and 215² on the start cycle switch 215 close relays 266 and 566 when this switch is pushed in, insuring that both slides start in high or traverse speeds. Advance switch LS1 will now be actuated by one of the programmer cams and now closes across 274 and 278, timer motor 279, line 280 to the other side 203, thus energizing timer motor 279. This timer 279 then closes cam switch 281, thus holding the timer in energized condition through current flowing from one side of the line 214 switch 281, line 278, timer motor 279, line 280 to the other side 203, this being necessary because the Advance switch LS1 is only momentarily closed and then reopened. Timer 279 also momentarily closes cam switch 281' which closes relay 257 so the slide will now advance at traverse rate. Relay 257 will hold on when 281' reopens through LS2 and 257² contact.

The relay 270 will not be energized when LS1 returns to normal because its holding circuit through holding contactor 270' is open.

Assuming that the Upper slide 46 now has advanced forward to the extent planned and it is against one of its stops 100, running at low or feed speed and slipping its clutch 74, which will usually be the case, the programmer now operates to momentarily open the Retract switch LS2 across the lines 274, 274'. This will open the holding circuit from line 274' to the holding contactor 257², line 274², contactor 270⁶, line 274³, contactor 250', line 258, relay 257 and line 259 to the other side 203, thus de-energizing relay 257. The cam switch LS2 then makes contact between 274 and line 274⁴, contactor 257' line 277, contactor 250³, line 271, relay 270 and line 272 to the other side 203, thus energizing relay 270. Relay 270 will now be held energized through its holding circuit, line 274, closed LS1, line 275, closed contactor 270', line 276, closed contactor 257', line 277, closed contactor 250³, line 271, relay 270 and line 272 to the other side 203, thus holding this relay 270 energized. With this Retract relay 270 energized as previously explained, the contacts 270² and 270³ are closed and running the motor 50 in reverse thus retracting the upper slide 46.

If it is desired to again go forward with the upper slide, and advance switch LS1 is again actuated by a programmer cam, since relay 270 has been running the motor 50 in reverse through its then closed contacts 270² and 270³, the contacts 257³ and 257⁴ being open when the relay 270 is deenergized by the opening of 274–275 by LS1, these contacts 270² and 270³ will open and the 257³ and 257⁴ contacts, after about one-half second through the timer action will close to reverse the motor 50. After the one-half second delay, timer cam switch 281' closes, permitting the passage of current from the line 274, closed Retract switch LS2, line 274', timer cam switch 281', line 274², relay switch 270⁶ line 274³, contactor 250', line 258, relay 257 and line 259 to the other side 203, thus energizing relay 257 which energization closes its forward switches 257³ and 257⁴ causing the motor and upper slide to go into forward or advance condition. Before reversal of the motor 50 takes place, the circuits through 257⁵, 270⁴, 266³ and 268⁴ were open, then relay 270 opens causing its switch 270⁴ to close which with already closed 257⁵ shunts the resistor 50b across the armature of 50 to brake the motor to a stop before it reverses into forward direction. This is only a momentary action since the timer 279 will cause its cam switch 281' to close after the short period of time closing relay 257 which cuts off the braking action of the braking resistor 50b by again opening the relay switch 257⁵. Just before the timer stops it again opens switch 281', but relay 257 will remain closed held by its holding contact 257².

With the motor running in slow speed dynamic braking will not be required and can be reversed without large voltage surges. However, with the slide at its other end the motor is almost always reversed at high speed producing large voltage surges, hence the use of the braking resistor 50b, as has been previously explained.

For traverse or high speed of the upper slide 46 when the programmer cam switch LS3 momentarily closes across the line contacts 238, 290, closed contactor 268³, line 291, contactor 250⁶, line 261, traverse relay 266, line 262 to the other side 203, energizing this relay 266, the holding contactor 266' is then closed by the energization and holding current then flows from line 238, switch LS4, line 292, relay holding contactor 266', line 290, relay contactor 268³, line 291, contactor 250⁶, line 261, relay 266 and line 262 to the other side 203, thus holding energization of this relay 266. Its other contact, FIG. 22, 266³ would be open as would either advance switch 257⁵ or reverse switch 270⁴, so that the shunt braking resistor 50b would not be across the armature of motor 50. Its contactor 266⁴ and either advance switch 257⁶ or reverse switch 270⁵ would be open as would be contactor 268⁵, placing the field weakening resistor 50r in series with the field winding 50f, thus causing the motor 50 to run at high or traverse speed. Also the relay switch 266[5] is allowing above full line voltage to be applied to the armature rectifier 50t for full speed of the motor 50.

To go into feed or low speed from traverse or high speed dynamic braking must be provided as previously described when the motor was reversed from retract to advance condition. When the Feed cam switch LS4 on the programmer is momentarily closed to its upper contact, circuit 238 to 292 is broken opening the holding circuit to relay 266, then current flows from line 238, switch LS4, line 282, closed contactor 268′, line 283, line 284, timer motor 285 and line 286 to the other side 203, thus starting the timer motor 285. Timer motor 285 then closes cam switch 278′ across line contacts 214 and 284, timer motor 285 and line 286 to line 203 to hold timer motor 285 in energized condition. Since timer motor 285 is now running after a half-second interval its cam switch 287′ will close and then current will flow from line 238, cam switch LS3, line 293, timer switch 287′, line 294, now closed relay switch 266[2], line 295, closed contactor 250[7], line 267, feed speed relay 268, line 269 to the other side of the line 203, closing relay 268. During the one-half second interval that both relays 266 and 268 were open, braking switch 268[4] and switch 266[3], FIG. 22, were closed with the others in this circuit being open and shunted in the braking resistor 50b across the armature of the motor 50 slowing it down and absorbing the high voltage surges. When relay 268 closes, the relay switch 268[5] shorts out the field weakening resistor 50r in series with the field winding 50f putting higher voltage on this field for slower speed of the motor 50 while also the relay switch 268[7] closes to provide lower preselected voltage to the armature rectifier 50t from the auto transformer 405, and the motor 50 goes into feed or low speed. Whenever 257[5] and 270[4] or 266[3] and 268[4], FIG. 22 are closed together to obtain dynamic braking, related contacts 257[6] and 270[5] or 266[4] and 268[6] will be closed to ensure full field current by shorting out resistor 50r, while braking is being effected. For the motor 50 to go from feed to traverse or high speed, no dynamic braking is required.

Timer motor 279 is a small synchronous motor geared down to a slowly rotating cam shaft on which two cams are mounted to operate the two switches 281 and 281′. After the approximate one-half second interval from the time LS1 is operated, the cam switch 281′ will be momentarily operated by its timer cam and the Advance relay 257 will be energized. As the contact of the switch 281′ is only momentary, energization of Advance relay 257 is held after switch 281′ has opened. Switches 281 and 281′ open together so that the timer shuts itself off after completing its cycle.

All the timers 279, 285, 579 and 585 are similar in construction and operation.

The above description of the operation of the upper slide 46 would be identically duplicated for operation of the lower slide 45 and therefore will not be repeated. The numerals identifying the electric elements and circuits of the lower slide will be identical as having the addition of three hundred such as the timer of the upper slide having the numeral 279, while the identical timer of the lower slide will be 579 and the descriptions will apply if these higher numerals are substituted. Also the Advance Retract switch 251 for the lower slide 45 and contactors 251[1], 251[2], 251[3], 251[4], 251[5], 251[6], 251[7] serving in their circuits exactly as those of the Advance Retract switch 250 for the upper slide. Again in regard to the Hand Traverse feed, it also has contactors 254[3] and 254[4] used in the Lower Slide 45 circuits in the same manner as its contactors 254[1] and 254[2] previously explained.

As will be seen in FIG. 11, one of the gears 146 has mounted on a back extension 147[1] of its hub 147, a cam 147[2] cooperating with a cam switch LS9. As has been previously explained, it will be observed that in FIG. 20 this switch LS9 is open, indicating the end of a cycle of automatic operation. When the Start cycle button switch 215 is closed and the programmer motor 130 is energized to start an operation, this cam switch LS9 will close and continue to provide current to relay 216 which supplies current to the programmer motor 130 when start cycle button is released. When a cycle has been completed LS9 will be opened by its cam 147[2] and the whole programmer comes to a stop and is ready for a repeat cycle.

What we have described is a pair of slides mounted one on top of the other, independently movable forwards or backwards which can dwell against stops with a constant pressure by slipping the clutch with the motor running. Fast traverse motions can also be obtained by running the motors at high speeds and slow feeds by slowing them down, with dynamic braking to make the slow down fast. Facing can be done by moving the top slide in against a stop and keeping the motor running to hold it there while traversing the lower slide to the work and then slowing to feed rate while taking the cut. After the cut both motors are reversed at traverse rate and the slides returned. Boring or turning is done by the reverse action of moving the bottom slide against a stop which sizes the bore or diameter, and holding while the top slide feeds in. As many as four different diameters or faces can be produced on a part in one setting by returning the slides to get new stops for the subsequent operation. If only one set of stops is required all four stops on each slide can be set the same, or one stop only can be set and the slide not travelled back to the indexing point, or screw 124 can be screwed in farther which will hold the pawl 121 out so it cannot engage the ratchet when the slide moves back.

The programmer shown in FIGS. 9–11 controls the slides through definite cycles which can be easily set to fit the job to be done. The programmer is driven by a synchronous motor which drives all eight program dials at the same speed. The motor has a brake mounted on it which eliminates any coasting when the motor is shut off. The change gears which slip on and off their shafts allow the selection of different cycle times depending on the job to be done.

We provide gears which give from 7 sec. to 60 secs. in certain increments. It is possible to get almost any cycle time wanted within the range with special gears. Each function of each slide is controlled by a separate program dial the cams of which operate a limit switch wired to the relay which controls the function. By pushing the start-cycle button the programmer, spindle and coolant pump motors run until the program dials have made one revolution, after which the limit switch LS9 opens and all the motors are stopped and brakes applied. This takes exactly the time for which change gears have been selected.

Each program dial has four cams under it which can be independently adjusted around the program dial, and locked in the selected position. The roller on the limit switch operator is wide enough so that all four cams will contact it. This makes it possible to group the various cams together so that one, two, three or four operations of the switch can be obtained for a revolution of the dial. This in turn allows the slides to be brought up, slowed down, etc. any of these number of times per cycle.

It will be understood that various changes in the details, materials and arrangements of parts which have been herein described and illustrated in order to explain the nature of the invention may be made by those skilled in the art within the principle and scope of the invention as expressed in the appended claims.

We claim:
1. A two slide mechanism, comprising,
   a pair of slides mounted for reciprocable movement perpendicularly to each other,
   a motor for moving each slide, a plurality of adjustable stop means mounted on each slide, a plurality of indexible abutment means which can be disposed in the travel path of said adjustable stop means, a slip clutch means between said motor and each slide which permits the slide and its adjustable stop to be moved toward said abutment means and will slip when there is engagement between a stop means and an abutment means while continually maintaining pressure between said engaged means, indexing means for moving any one of said indexible abutment means into position for engagement with an adjustable stop, and programming means for controlling said indexing means so that any one of said indexible abutment means may be moved into position for engagement with a given stop means.

2. A two-slide mechanism having its slides mounted for movement at right angles to each other, a motor for moving each slide, a plurality of adjustable stops for each slide, a slip clutch between each motor and its slide and which moves its slide into engagement with a stop and holds it frictionally against the stop, programming means cooperating with said stops for imparting separate and distinct movements to said slides, indexing means cooperating with said stops and adjustable to stop each slide successively at a plurality of different stations without simultaneously stopping rotation of the motor.

3. A two-slide mechanism for use in connection with a machine having a rotary spindle, one of the said slides movable transversely of the axis of said spindle and the other slide movable lengthwise thereof, a reversible motor for each slide, a drive connection between each motor and its slide for moving the slide backward and forward, one of said slides having a cutting tool mounted thereon for engagement with work mounted on said spindle, a plurality of adjustable stop means mounted on each slide each of which limits the movement of the slide to a different distance, a plurality of indexible abutment means which can be disposed in the travel path of said adjustable stop means, indexing means for moving any one of said indexible abutment means into position for engagement with an adjustable stop, programming means for controlling said indexing means so that any one of said indexible abutment means may be moved into position for engagement with a given stop means, and control means connected with each of said motors for actuating the same to move said slides into engagement with said stops.

4. A two-slide mechanism according to claim 3 and including slip clutches interposed in the drive connections between said motors and said slides to exert uniform pressure against said stops while said motors continue to run at substantially uniform speed, to enable said motors to continue to run when said slides are stopped.

5. A two-slide mechanism for use in connection with a machine having a rotary spindle as set forth in claim 3, wherein:

slip clutches are connected with each of said motors for holding a slide and its stop means in engagement with an indexible abutment means while the other slide is being moved by the other motor.

6. A two-slide mechanism for operating on workpieces including a motor for moving each slide, adjustable stop means on said mechanism for stopping said slides in desired relation to the workpieces, separate control means for each motor, and a programmer for each slide having dials rotated at the same speed, a group of cams secured to each of said dials, and adjustable relatively to each other and to the dial on which a group of cams are mounted, a switch for each dial actuated by the cams of a group, one dial and its group of cams being provided for advancing a slide, another dial and cams for retracting its slide, another dial and its cams being for operating a slide at a high speed, another dial and its group of cams being for moving its slide at a lower speed, and electrical controls actuated by said cams and switches and connected with the motor to control the movements of its slide.

7. A machine for cutting a workpiece, comprising:

a base having upper and lower slides mounted for reciprocable movement perpendicularly to each other, a cutting tool mounted on the upper slide, a plurality of adjustable stop means mounted on each slide, a plurality of indexible abutment means which can be disposed in the travel path of said adjustable stop means, indexing means for moving any one of said indexible abutment means into position for engagement with an adjustable stop means, a motor connected to each slide for providing independent movement of said slides, a programmer having rotary cams mounted to actuate electrical switches for each of said motors and adjustable to determine the time when the switches are to be activated, electrical circuitry connecting said switches through intermediate devices with each of said motors, driving means independent of said motors for turning said rotary cams, said cams being arranged in two independently adjustable groups, one of said groups controlling movement of one of said motors, a second group controlling movement of the other motor, and programming means for controlling said indexing means so that any one of said indexible abutment means may be moved into position for engagement with a given stop means.

8. A machine as set forth in claim 7, wherein:

circuit control means is provided for braking each of said motors.

9. A machine as set forth in claim 7, wherein means is connected to said rotary cams for varying the speed of rotation of said cams.

References Cited by the Examiner
UNITED STATES PATENTS

| | | | |
|---|---|---|---|
| 1,367,459 | 2/1921 | Carson. | |
| 2,029,335 | 2/1936 | Oberhoffken et al. | |
| 2,168,632 | 8/1939 | Smith | 82—24 |
| 2,172,999 | 9/1939 | Hoelscher | 82—21 |
| 2,401,276 | 5/1946 | Schauer et al. | 77—32.5 |
| 2,488,620 | 11/1949 | Evenstad et al. | |
| 2,557,860 | 6/1951 | Bickel et al. | |
| 2,585,215 | 2/1952 | Bickel et al. | 82—24 |
| 2,585,217 | 2/1952 | Bickel et al. | 82—21 |
| 2,838,967 | 6/1958 | Meyer | 192—142 X |

WILLIAM W. DYER, Jr., *Primary Examiner.*